United States Patent [19]
Wycoff

[11] 4,084,138
[45] Apr. 11, 1978

[54] SELECTIVE CALL COMMUNICATION SYSTEM

[76] Inventor: Keith H. Wycoff, 1205 N. Tyler St., Lexington, Nebr. 68850

[21] Appl. No.: 587,333

[22] Filed: Jun. 13, 1975

[51] Int. Cl.² .......................................... H03B 19/00
[52] U.S. Cl. ...................................... 325/55; 331/76; 340/171 R
[58] Field of Search ........ 340/171 R, 171 A, 171 PF; 325/55, 64, 153; 331/76

[56] References Cited
U.S. PATENT DOCUMENTS

| Re. 28,157 | 9/1974 | Wycoff | 340/171 X |
|---|---|---|---|
| 3,513,399 | 5/1970 | Wycoff | 340/171 X |
| 3,613,004 | 10/1971 | Wycoff | 340/171 X |
| 3,740,550 | 6/1973 | Geiger | 340/171 PF |
| 3,747,108 | 7/1973 | Ringer | 340/171 PF |
| 3,866,124 | 2/1975 | Wycoff | 325/64 |

*Primary Examiner*—Benedict V. Safourek
*Attorney, Agent, or Firm*—Vogel, Dithmar, Stotland, Stratman & Levy

[57] ABSTRACT

The encoder in such system generates a sequence of tones in which every other tone is selected from a first group of tones in one band of frequencies, and the remaining tones in the sequence are selected from a second group of tones in another band of frequencies. The tones in the second group are respectively harmonically related to the tones in the first group, such as having frequencies double the respective frequencies of the tones in such second group. The tones are generated by an oscillator in the encoder, every other tone being multiplied by ½, for example. Circuitry, coupled to the oscillator and to the multiplier, alternately delivers the divided and undivided tones, to create the afore-mentioned sequence of tones.

The oscillator has associated therewith a switchable impedance, predetermined amounts of which are sequentially switched into the oscillator to cause it to produce the sequence of tones. To minimize energy loss, circuitry is provided to insure that the phase of the tones is substantially continuous as the different amounts of impedance are switched into the oscillator.

A programming device enables internal fixing of the frequencies of certain tones, which tones represent the identification of the encoder. A manual selector enables external selection of the frequencies of other tones which represent other information relative to the encoder.

23 Claims, 5 Drawing Figures

SELECTIVE CALL COMMUNICATION SYSTEM

BACKGROUND OF THE INVENTION

In a selctive call communication system a particular receiver is rendered operative when the carrier wave signal applied thereto contains a certain tone or set of tones to which the decoder in such receiver is designed to respond. These tones are generated by an encoder, which tones are then modulated onto the carrier wave generated by the transmitter with which that encoder is associated. In systems involving voice communication, the tone or set of tones is transmitted to unsquelch the receiver, whereupon the operator at the transmitter can speak into his microphone and the possessor of the associated receiver will hear his words. Alternatively, the system may involve nonvoice communication, wherein the receiver emits an alerting signal such as a tone when the proper tone or set of tones is applied thereto.

Usually in such systems, there is a single base station which has a transmitter, an associated encoder, and other interface equipment to enable persons to gain access to the transmitter. Such equipment may take the form of a telephone system in which a person dials a certain number to connect the telephone to the transmitter, whereupon a selected code may be transmitted. Usually a multiplicity of receivers will be associated with such transmitter. For example, a system used in a hospital would entail each doctor being furnished with a receiver designed to emit an alerting signal in response to a unique code. In this type of system, the transmitter is likely to be very expensive compared to the cost of the individual receivers. Since there is only one transmitter, the cost thereof does not render the cost of the entire system prohibitive.

It has been proposed to use selective call capability in an automatic identification system. In such system, each user, such as a vehicle, is furnished with a transmitter and an associated encoder to enable the user, not only to receive a voice message, but also to communicate with the base station and also to identify himself without so stating. When the vehicle driver wishes to communicate with the base station, he operates his push-to-talk switch and speaks into his microphone. With automatic identification capabilities, the encoder generates a signal representing that encoder, which signal is modulated onto the carrier wave. The identification signal, by way of a suitable display or otherwise, apprises the base station operator of the identity of the encoder transmitting. The value of such automatic identification is recognized and need not be delved into here. In prior systems, the information automatically sent to the base station has been limited to the identity of vehicle or driver. Such systems have not supplied additional information, such as where the vehicle is located or what is its status, etc.

Furthermore, the encoders previously available have not been sufficiently inexpensive to enable widespread use such as is necessary when many vehicles are provided with an encoder.

It is important in selective call communication systems to maximize the number of channels used in a given frequency spectrum. In other words, if the frequency spectrum for tones is, for example 500 Hz. to 3,500 Hz., it is desirable to maximize the number of channels within that range that can be utilized. Of course, the limiting factor is that the channels cannot be so close that operation of a decoder responsive to one channel will also operate a decoder responsive to an adjacent channel. Furthermore, with limiting, the encoders generate not only the specific tone, but also its harmonics, particularly its third harmonic. It is therefore important that the third harmonic of one tone in the frequency spectrum not coincide with other channels in the spectrum and, in fact, be as far removed as possible therefrom.

Since each vehicle in such a system is also provided with a receiver and an associated decoder to respond to a particular sequence of tones, it is equally desirable that the cost of the decoder be minimized.

SUMMARY OF THE INVENTION

It is therefore an important object of the present invention to provide in a selective call communication system encoders and decoders which are less expensive to make.

Another object is to provide an automatic identification system which not only supplies the base station with the identity of the encoder transmitting, but also other selected information, such as its status.

Still another object is to maximize the frequency difference between tones used in a selective call communication system and third harmonics of such tones.

In one aspect of the present invention, there is provided an encoder for a selective call transmitter comprising oscillator means for producing a sequence of first tones, multiplier means coupled to the oscillator means for multiplying the frequencies of the first tones by a predetermined multiplier to produce a sequence of second tones, an output circuit coupled to the oscillator means and to the multiplier means for receiving the sequence of the first tones and the sequence of the second tones, and control means coupled to the output circuit for rendering the output circuit operative to alternate between supplying the first tones and the second tones.

In another aspect of the invention, the encoder also comprises switchable impedance means associated with the oscillator means for controlling the frequency of the tone produced thereby, counter means coupled to the switchable impedance means for sequentially changing the value of impedance furnished thereby to cause the oscillator means to produce a sequence of tones, clock means for producing clock pulses at a predetermined rate, and switching means having a pair of inputs respectively coupled to the oscillator means and to the clock means for producing a sequence of pulses at the predetermined rate each having a leading edge in time coincidence with an instant when the amplitude of the tone produced by the oscillator means is substantially zero, whereby each tone in the sequence of tones has a duration substantially proportional to the predetermined rate and is substantially in phase with the preceding tone in the sequence of tones.

In yet another aspect of the invention, the oscillator means generates tones selected from a first group of tones in a first band of frequencies and tones selected from a second group of tones in a second band of frequencies separate and distinct from the first band of frequencies, the tones in the second bank respectively being harmonics of the tones in the first bank, and means for receiving the tones from the oscillator means and for producing a sequence of tones alternately from the first and second groups.

In a further aspect of the invention, the sequence of tones produced by the oscillator means includes at least one identification tone representing the identification of the encoder and at least one information tone representing information relative to the encoder, program means for internally fixing the frequencies and the order of the identification tones, and selector means for externally selecting the frequencies of the information tones, whereby energization of the encoder automatically produces identification tones corresponding to the program of the program means and information tones corresponding to the condition of the selector means.

In a still further aspect, there is provided a single switch for operating the encoder and the decoder, and lockout circuitry to insure that when the decoder is in use, the associated encoder is not accidentally operated.

The invention consists of certain novel features and a combination of elements hereafter fully described, illustrated in the appended claims, it being understood that various changes in the details of the circuitry may be made without departing from the spirit or sacrificing any of the advantages of the invention.

BRIEF DESCRIPTION OF THE DRAWINGS

For the purpose of facilitating an understanding of the invention, there is illustrated in the accompanying drawings preferred embodiments thereof, from an inspection of which, when considered in connection with the following description, the invention, its construction and operation, and many of its advantages can be readily understood and appreciated.

DETAILED DESCRIPTION OF THE PREFERRED EMBODIMENTS

Figure 1:
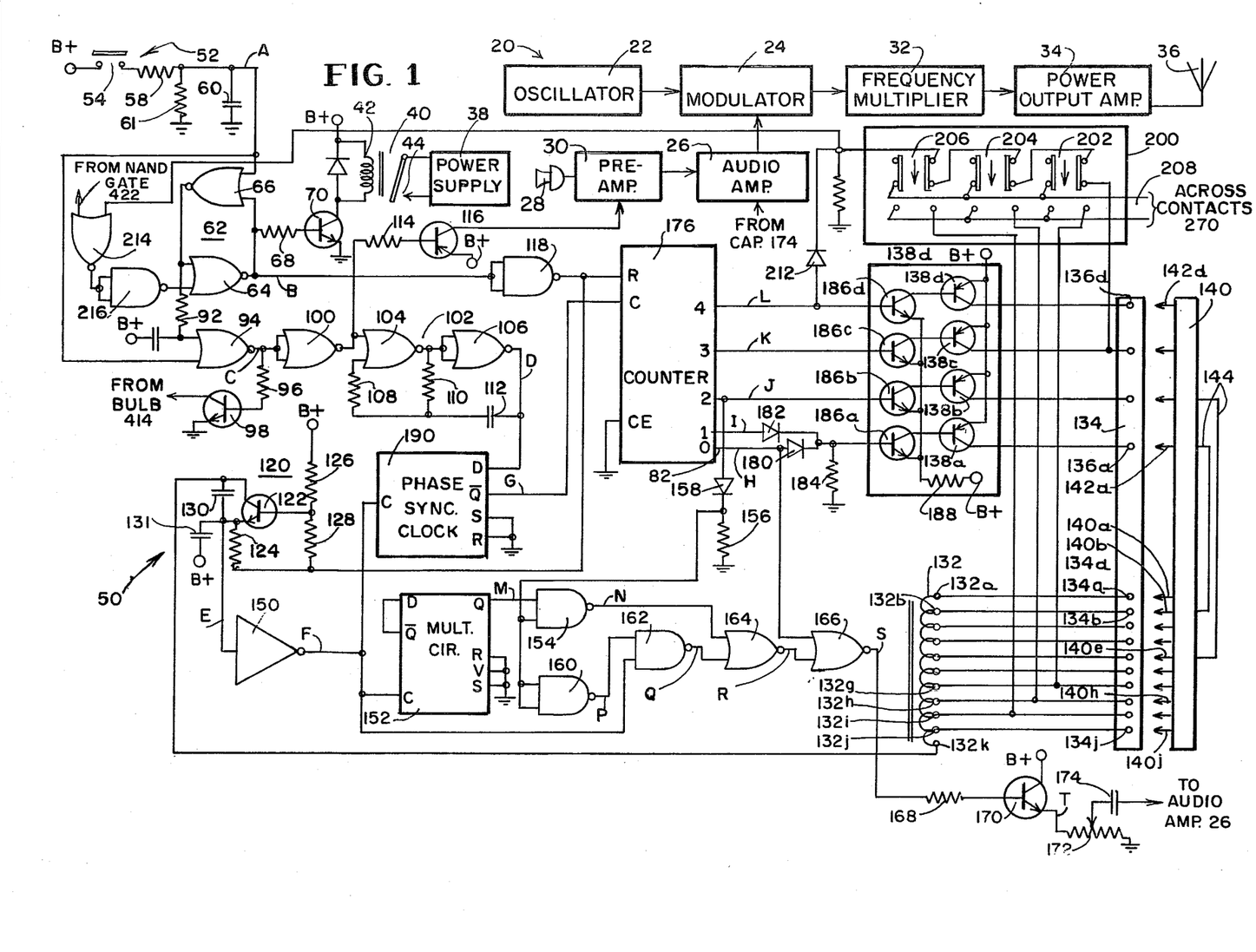
FIG. 1 is a diagram partially in block and partially in schematic depicting a selective call communication transmitter having an encoder incorporating the features of the present invention.

Turning first to FIG. 1, there is depicted therein a transmitter 20 adapted to generate an RF carrier wave modulated selectively by audio signals and by tones. The transmitter 20 includes an oscillator 22 which develops on its output a relatively low-frequency oscillatory signal. A modulator 24 receives the oscillatory signal from the oscillator and also receives audio signals supplied by an audio amplifier 26. The audio signals are either tones generated by an encoder to be described presently or electrical signals representative of a voice message applied to a microphone 28 and then amplified in a preamplifier 30. The audio signals from the amplifier 26 are modulated by the modulator 24 onto the oscillatory signal. The frequency of the modulated signal is increased in a frequency multiplier 32 and then its amplitude increased in a power output amplifier 34, thereby to provide a high level, frequency multiplied carrier wave which is emitted from an antenna 36. Although the transmitter 20 is of the FM type, that is merely exemplary.

The transmitter 20 also includes a power supply 38 which provides a supply voltage to the other elements in the transmitter, including the power output amplifier 34, the audio amplifier 26, etc. The power supply 38 is selectively rendered operative by a relay 40 having a winding 42 and contacts 44. In a manner to be described presently, when the winding 42 is energized, the contacts 44 close to enable the power supply 38 to supply power to the rest of the transmitter 20.

Figures 1A, 2:
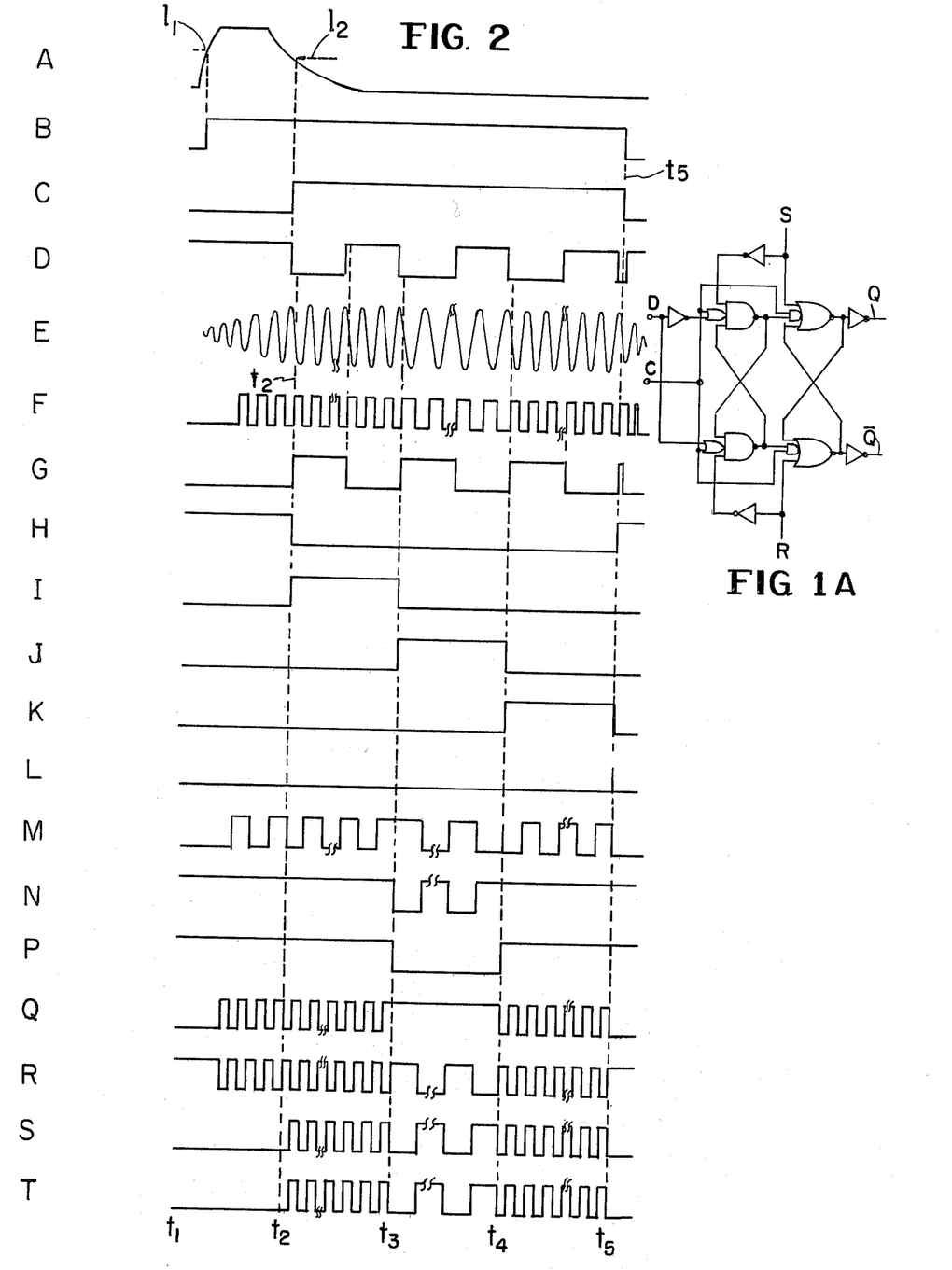
FIG. 1A is a block diagram of the multiplier circuit and the phase-synchronized circuit of FIG. 1.
FIG. 2 is a timing diagram showing wave forms at various points in FIG. 1.
Figure 3:
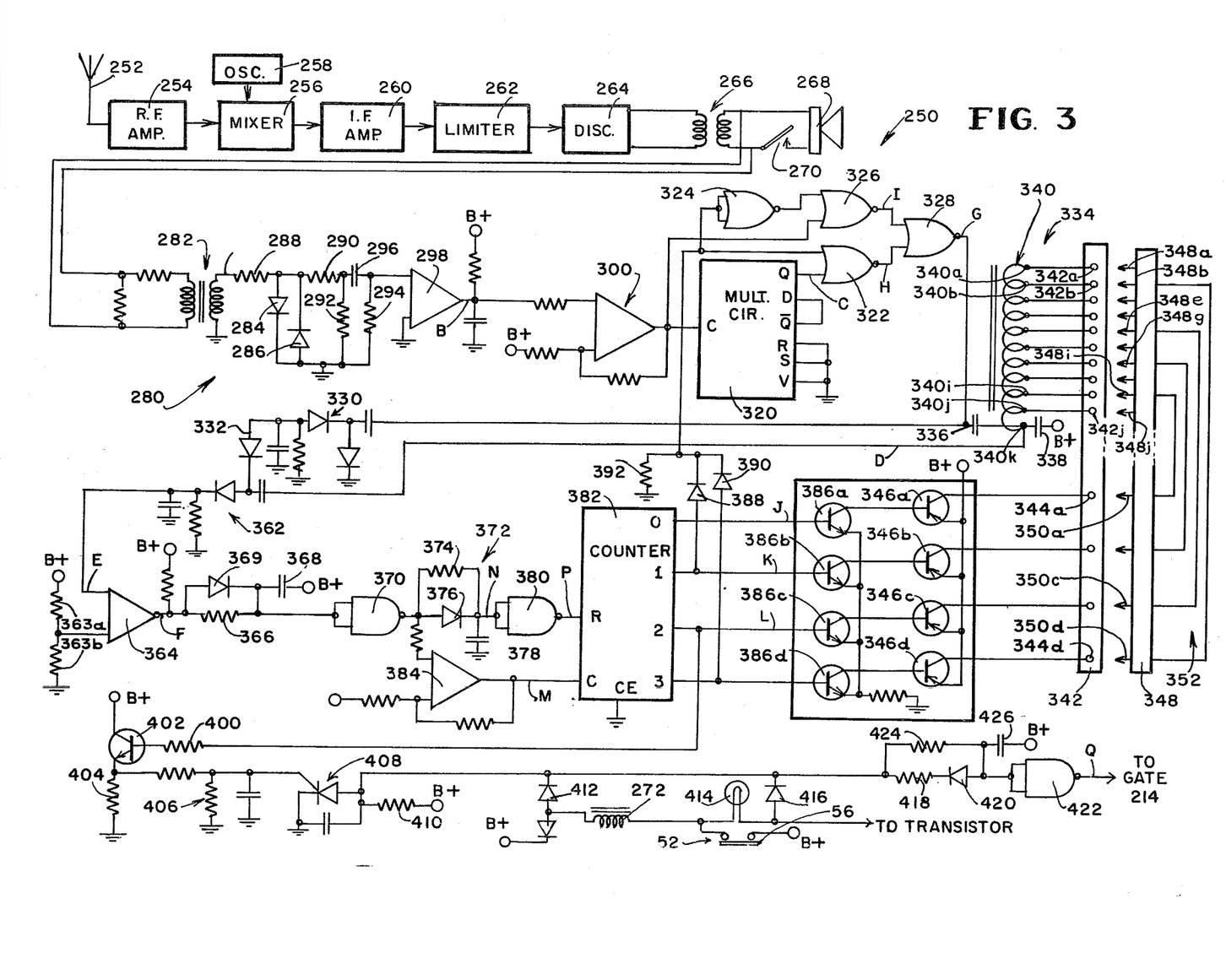
FIG. 3 is a diagram partially in block and partially in schematic depicting a receiver having a decoder incorporating therein other features of the present invention.

The transmitter 20 also includes an encoder 50 which provides the tones to the audio amplifier 26. The encoder 50 includes a switch 52 having a set of normally open contacts 54 and a set of normally closed contacts 56 (FIG. 3). A single actuator (not shown) is adapted simultaneously to close the contacts 54 and to open the contacts 56. A capacitor 60 is charged rapidly through a resistor 58 when the contacts 54 are closed, and discharged relatively slowly through a resistor 61. There is provided a latching circuit 62 which is in the form of a bistable multivibrator and is composed of two NOR gates 64 and 66 connected as shown. When the switch 52 is actuated, the contacts 54 close and, as shown in FIG. 2A, the capacitor 60 charges rapidly, in about 2 ms., to a level 1, at which the latching circuit 62 switches, and the output thereof becomes "high," as can be seen in FIG. 2B. As is standard in logic nomenclature, this application will refer to "high" and "low" inputs and outputs. The term "low" means that the voltage is at its low value, for example, zero, and the term "high" means that it is at its high value, for example, close to the supply voltage.

The output of the latching circuit 62 is connected by way of a resistor 68 to an NPN transistor 70, the emitter of which is grounded and the collector of which is coupled through the relay winding 42 to the B+ supply voltage. Thus, when the latching circuit 62 is energized, and the output thereof becomes high, the transistor 70 is rendered conductive to energize the relay 40, closing the contacts 44 and thereby supplying power to the transmitter 20, enabling it to produce a carrier wave prior to transmitting the tones.

The output of the NOR gate 66 is coupled through a resistor 92 to one input of a NOR gate 94, the other input of which is derived from the contacts 54. The output of the NOR gate 94 is coupled by way of a resistor 96 to an NPN transistor 98, having its emitter grounded and its collector coupled to a bulb 414 (FIG. 3). The output of the NOR gate 94 is also coupled to a further NOR gate 100 connected to be an inverter. The output of the NOR gate 100 is coupled to an astable multivibrator 102 comprised of two NOR gates 104 and 106, resistors 108 and 110, and a capacitor 112. When energized, the multivibrator 102, as shown in FIG. 2D, produces a sequence of pulses having a predetermined repetition rate determined by the values of the resistors 108 and 110 and the capacitor 112. The resistor 110 is variable to enable selection of such rate, which controls the duration of each tone in the sequence produced by the encoder 50.

When the contacts 54 are closed, the capacitor 60 charges rapidly, as previously mentioned. When the switch 52 is released, the contacts 54 open and the capacitor 60 discharges through the resistor 61, causing the NOR gate 94 to switch when the voltage reaches the level $1_2$ (FIG. 2A). The output of the NOR gate 94 thereupon becomes high (FIG. 2C), to render conductive the transistor 98 and to cause illumination of the bulb 414 (FIG. 3). The high output from the NOR gate 94 is inverted by the NOR gate 100 to provide a low input to the NOR gate 104, thereby rendering the multivibrator 102 operative to produce the sequence of pulses. One input to the NOR gate 94 remains low until the next time the switch 52 is actuated, while the other input remains low until the latching circuit 62 is opened, in the manner to be described hereinafter.

The output of the NOR gate 100 is also coupled by way of a resistor 114 to the base of a PNP transistor 116 having its emitter coupled to the supply voltage and its collector coupled to the preamplifier 30. When the output of the NOR gate 100 becomes low, the transistor 116 is rendered conductive, which applies a disabling voltage to the preamplifier 30. Thus, while the tones are being generated, no speech applied to the microphone 28 will be transmitted.

The output of the latching circuit 62 is inverted by an inverter 118, the output of which is coupled to an oscillator 120. An NPN transistor 122, biasing resistors 124, 126, and 128, frequency determining capacitors 130 and 131, and an inductor 132 comprise the oscillator 120. The oscillator 120 begins to produce a signal (FIG. 2E) at the same time the output of the NOR gate 64 becomes high.

The inductor 132 has ten taps 132a to 132j. A terminal block 134 has a plurality of electrical sockets 134a through 134j respectively coupled to the taps 132a to 132j. Also, the block has a set of sockets 136a to 136d respectively coupled to the collectors of four switching transistors 138a to 138d, the emitter of each of which switching transistors is coupled to the B+ supply voltage. Associated with the block 134 is a plug 140, having pins 140a to 140j and 142a to 142d. The plug 140 is adapted to be programmed to set the code produced by the encoder 50 by connecting jumper wires from selected ones of the pins 140a to 140j to the pins 142a to 142d. The particular encoder shown is capable of producing a sequence of as many as four tones which can be internally programmed by connecting all four pins 142a to 142d to selected pins 140a-140j. As an example only pins 140b and 140e, are respectively connected by way of jumper wires to the pins 142a and 142b, so as to internally to program two tones. The particular embodiment described envisions a sequence of two internally programmed tones followed by a third externally selected tone, as will be explained.

Initially the transistor 138a is conducting, whereas the transistors 138b to 138d are initially nonconducting, which will be described in greater detail hereinafter. Then, the supply voltage on the emitter of the transistor 138a is coupled through its collector, through the terminal 136a, the pin 142a, the corresponding jumper 144, the pin 140b, the socket 134b, whereby that portion of the inductor 132 between a tap 132b and an end 132k will be in circuit with the oscillator 120. The oscillator 120 will therefore produce a tone when energized, in accordance with the value of such inductance and the value of the capacitor 130.

As previously explained, the output (FIG. 2B) of the NOR gate 64 becomes high when the switch 52 is closed, which output is inverted by the inverter 118 to provide a low input to the oscillator 120 for energization thereof. The output from the oscillator 120 is derived from the emitter of the transistor 122, the oscillatory signal produced thereby being amplified and inverted by the amplifier 150 to produce a square wave (FIG. 2F) of a frequency corresponding to the frequency of the oscillatory signal from the oscillator 120. Such square wave is applied to the clock input C of a multiplier circuit 152.

The multiplier circuit 152 consists of a "dual 'D' type flip-flop" device with set and reset capability, having set (S), reset (R), clock (C), data (D), and supply (V) inputs and "Q" and "Q" outputs. Each such device is schematically illustrated in FIG. 1A. As an example, Solid State Scientific, Inc. makes a product under the designation LCL4013A which contains two such flip-flops on a single monolithic silicon chip. The D and Q inputs are connected together, and the R, V, and S are grounded. With such connections, the signal on the Q output has one half the frequency of the signal on the C input, whereby the predetermined multiplier of the multiplier circuit 152 is one half. Therefore, there will appear on the Q output a square wave, as shown in FIG. 2M, at one half the frequency of the oscillatory signal (FIG. 2E) from the oscillator 120. The second input to the NAND gate 154 is derived across a resistor 156 through a diode 158. The signal applied to such diode, as shown in FIG. 2J, becomes high during the second tone, and is low before and after the second tone. The origin of such signal will be described hereinafter. Accordingly, as can be seen in FIG. 2N, the output of the NAND gate 154 is high during the first tone, and follows the Q output (FIG. 2M) during the second tone, but is inverted. The signal represented by the waveform of FIG. 2J is also coupled to a NAND gate 160 connected as an inverter, whereby the output (FIG. 2P) thereof is low during the second tone, but is high the rest of the time. The output of the NAND gate 160 is connected to one input of a further NAND gate 162, the other input of which is coupled to the output of the amplifier 150. The low input to the NAND gate 162 during the second tone causes the output of the NAND gate 162 to be high for that interval, but, during the rest of the time, there appears on such output an inverted form of the square wave from the amplifier 150. The output of the NAND gates 154 and 162 are respectively coupled as inputs to a NOR gate 164. During the first and third tones, the signal from the NAND gate 162 (FIG. 2Q) is inverted and coupled to the output of the NOR gate 164, while during the second tone the output of the NAND gate 154 (FIG. 2N) is coupled to such output, whereby the output of the OR gate 164, shown in FIG. 2R, includes a first tone having a frequency equal to the frequency of the tone produced by the oscillator 120 during the interval $t_2-t_3$, a second tone having a frequency equal to one half the frequency of the tone produced by the oscillator 120 during the interval $t_3-t_4$, and a third tone having a frequency equal to the frequency of the tone produced by the oscillator 120 during the interval $t_4-t_5$.

The output of the NOR gate 164 is coupled to a further NOR gate 166 having a second input on which appears a signal represented by the waveform of FIG. 2H. Such input is high prior to time $t_2$ when the tones commence, whereby the output of the NOR gate 166, as shown in FIG. 2S, is low during the interval $t_1-t_2$. Starting at $t_2$, the output of the NOR gate 166 is the inverse of the output from the NOR gate 164 (FIG. 2R).

The output of the NOR gate 166 is coupled by way of a resistor 168 to an emitter follower transistor 170, the collector of which is coupled to the supply voltage, and the emitter of which is coupled through a potentiometer 172 to ground. The movable arm of the potentiometer 172 is coupled by way of a capacitor 174 to the audio amplifier 26. The signal coupled to the amplifier 26 consists of a sequence of three square wave tones, shown in FIG. 2T.

The transistors 138a to 138d are sequentially rendered conductive by, and certain of the inputs to the gates 154, 160, and 166 are derived from, a counter 176. The counter 176 has a plurality of outputs and a clock input. A pulse train applied to the clock input will cause each output to become high in succession. An example of a counter that may be used, is one sold by Solid State Scientific, Inc. under the designation SCL4017A, which it calls a "CMOS decade counter/divider." Such device has clock (C), reset (R), clock enable (CE) inputs, and ten outputs "0" to "9". In this particular form, only the outputs "0" to "4" are used, and therefore outputs "5" to "9" are not shown. The CE input is grounded, the R input is coupled to the NAND gate 118, and the C input is coupled to a clock 190 which furnishes a sequence of pulses shown in FIG. 2G. With such connections, the "0" output is high and the other outputs "1" to "4" are low in the quiescent condition of the counter 176. The first positive going transition at the C input causes the "0" output to become low, the "1" output to become high, and the "2" to "4" outputs to remain low. The next positive transition at the C input causes the "2" output to become high and the rest of the outputs to be low, etc. In order for the stepping operation just described to take place, the R input must be low.

The "0" and "1" outputs are coupled respectively through diodes 180 and 182 to appear across a resistor 184 as inputs to an NPN transistor 186a, the collector of which transistor is coupled to the base of the transistor 138a. The transistors 186a and 138a define an electronic switch. The "2", "3" and "4" outputs are respectively coupled to NPN transistors 186b, 186c and 186d, the collectors of which transistors are respectively connected to the bases of the transistors 138b to 138d. Associated pairs of the transistors (e.g. 186b and 138b) define electronic switches.

Initially, the "0" output of the counter 176 is high (FIG. 2H), thereby actuating the switch consisting of the transistors 138a and 186a, to cause the associated portion of the inductor 132 to be coupled in circuit in the oscillator 120, as previously described. As can be seen in FIG. 2G, the first positive transition of the C input to the counter 176 occurs at time $t_2$, causing the counter 176 to step so that the "1" output becomes high (FIG. 2I). The transistors 186a and 138a are maintained conductive so that the oscillator 120 continues to run at the same frequency. The next clock pulse, that is, a positive transition, occurs at time $t_3$, which causes the "2" output to become high (see FIG. 2J). The transistors 186b and 138b conduct, thereby coupling in the oscillator 120 another portion of the inductor 132. Similarly, when the "3" output of the counter 176 becomes high (FIG. 2K), in response to a clock pulse at $t_4$, yet another portion of the inductor 132 is connected in circuit with the oscillator 120 to change the frequency of oscillation thereof.

In order to insure that there are no discontinuities as the oscillator 120 changes its frequency of oscillation, there is provided a phase synchronized clock 190 to supply the pulses to the "C" input of the counter 176, such clock is the second flip-flop device on the silicon chip, previously discussed (the first such flip-flop device is the multiplier circuit 152). The flip-flop device constituting the phase synchronized clock 190 also has data (D), set (S), reset (R), and clock (C) inputs and Q and Q outputs. The S and R inputs are connected to ground, the D input is connected to the output of the NOR gate 106, and the clock input C is connected to the inverting amplifier 150. Considering the logic of the clock 190, its Q output will become high if its D input is low and its C input has a rapidly rising transition; the Q output will become low if the D input is high and the C input receives a rapidly rising transition; and the Q output will not change if the C input is receiving a rapidly falling transition, irrespective of the D input.

Referring to FIG. 2D, the D input first becomes low shortly before $t_2$. Referring to FIG. 2F, the C input receives a rapidly rising transition at $t_2$, at which time, therefore, the Q output rises, as may be seen in FIG. 2G. The Q output remains high until the concurrence of a high D input and a rising transition at the C input. Thus, midway between time $t_2$ and $t_3$, the Q output becomes low. At time $t_4$, the D input is already low and the C input receives a rising transition, whereby the Q input becomes high. Following through on this analysis the clock signal appearing on the Q output is that shown in FIG. 2G. It should be noted that the leading edge of each positive pulse in the wave form of FIG. 2G is in time coincidence with a leading edge of a pulse in the pulse train at the output of the amplifier 150 (FIG. 2F), which in turn corresponds to the instant when the signal out of the oscillator 120 is substantially zero (FIG. 2E). It is the leading edge of each of the positive pulses on the Q output which, when applied to the clock input C of the counter 176, causes the counter 176 to step to the next output, as may be seen by FIGS. 2G-2L and the dashed vertical lines therebetween. It is at these times, when the frequency of oscillation of the oscillator 120 shifts and because it is shifting at a time when the amplitude of the oscillatory signal produced thereby is substantially zero, there will be no discontinuity between the two tones as the change takes place. In other words, there will be a minimal loss of energy by the oscillator 120 during the transition, because the phase between two tones in sequence is substantially continuous. This also results in a faster tone signaling.

While the first two tones in the sequence are internally programmed by the jumpers 144 and the plug 140, the third tone is externally programmed by a switching apparatus 200 having three double-throw switches 202, 204, and 206 connected in the manner shown. Each of the switches has a first position shown and a second position when each slide contact is moved to continue to engage the center fixed contact, and to engage the lower fixed contact rather than the upper fixed contact. If the switch 202 is actuated, there will be coupled to the collector of the transistor 138c the tap 132g. In that case, the oscillator 120 will produce during the last interval $t_4$–$t_5$ an oscillatory signal corresponding to the value of the inductance between the taps 132g and 132j. If, instead, the switch 204 is actuated, then the oscillatory signal will be representative of the inductance between the taps 132h and 132j, while, if the switch 206 is, instead, actuated, the oscillatory signal will have a frequency dependent upon the value of the inductance between the taps 132i and 132j. When any one of the three switches 202 to 206 is actuated, there will appear a short across the conductors 208 which, in turn, renders the speaker (FIG. 3) operative to hear whether the channel corresponding to the decoder is being used. If he hears communication, then he knows that the channel is being used and he must wait. As soon as the channel is quiet, he can operate the switch 52 to transmit the sequence of three tones, the first two of which were internally programmed by the connector 140 and represent the identification of the encoder 50, while the third tone in the sequence has been manually selected by the operator of the encoder, by actuating one of the switches 202 to 206. Actuation of the switch 202 might mean, for example, that the vehicle in which the encoder 50 is mounted is available for assignment, while actuating the switch 204 might mean that he has just completed assignment and is going home, etc.

Upon completion of the three tones, the "4" output of the counter 176 becomes high (FIG. 2L), which output is coupled through a diode 212 as one input to a NOR gate 214, the output of which NOR gate is inverted by an inverter 216, and then coupled as a second input to the NOR gate 64. The high input to the NOR gate 214 supplies a low input to the NOR gate 64, thereby opening the latch at time $t_5$, that is, the output of the NOR gate 64 becomes low. Such low output de-energizes the transistor 70, so that the supply voltage from the power supply 38 to the transmitter 20 is disrupted. Also, the low output from the NOR gate 64 is inverted by the inverter 118 to cause the R input of the counter 176 to become high, thereby resetting the counter. When reset, its "0" output becomes high and the other outputs "1" – "4" are low. The high output from the inverter 118 de-energizes the oscillator 120, causing the oscillatory signal (FIG. 2E) to end. The output of the NOR gate 66 becomes high, thereby providing a high input to the NOR gate 94, causing the output of the NOR gate 94 to become low, thereby extinguishing the bulb 414, so as to apprise the operator that the tone transmission has been completed. Also, operation of the multivibrator 102 is disrupted and the preamplifier 30 enabled.

A high input to the NOR gate 214, to accomplish the termination and reset just described, is also furnished by the switch apparatus 200. If none of the switches 202, 204 and 206 is actuated, then, during the third tone when the transistor 138c becomes conductive, the supply voltage will be coupled therethrough, through the switches 202, 204 and 206, to provide the high input to the NOR gate 214.

It should be understood that the encoder 50 is more inexpensively constructed because of the use of a single oscillator to provide twenty different tones. Ten tones are provided by virtue of the ten taps on the inductor 132, and ten more tones are provided by halving the signals produced by that oscillator. The absence of the additional oscillator and associated circuitry also reduces the weight and size of the encoder.

The encoder 50 has capability of being internally programmed to establish the tones for automatic identification. Also, externally selected tones supply information on the status of the encoder.

Although only five outputs of the counter 176 are shown, the particular counter used in the example has ten such outputs, so that it has the capability of supplying several more tones in sequence if desired. Also, the number of tones being internally programmed and the number of tones subject to external selection can be varied in accordance with particular needs.

There can be provided various socket and plug arrangement, such as has been shown to select the frequencies of oscillation of the oscillator 120, and to select the number of tones. One such socket-plug arrangement could be used which couples all those outputs of the counter that are needed to interconnect the switching transistors 138a–138d to the associated coil taps. Alternately, a socket-plug arrangement may be employed to select all tones in the sequence by the switching apparatus 200. For example, all ten tones could be available for external selection, rather than just the three corresponding to the taps 132j to 132i.

The selection of the tones in the encoder 50 is significant. First, it is clear that the every other tone in the transmitted sequence is selected from one bank of frequencies, while the remaining tones are selected from a second bank. The ten tones in the first bank are respectively harmonics of the ten tones in the second bank; in this example, each tone in the first bank is a second harmonic of a corresponding tone in the second bank. However, other harmonic relationships are certainly contemplated.

One difficulty in making the proper selection of available tones is to insure that harmonics of the tones in one bank are not the same as tones in the other bank. This consideration is particularly important in an encoder as above described, since it squares the oscillatory signal. A square wave has virtually no second harmonics of the original sine wave, but is rich in third harmonics. In fact, it is desirable that the third harmonics actually be displaced by as much as possible from the tones in the other bank. It has been found that such optimum placement occurs when each tone is the 11th root of 2 times the next lower tone. The tones in the other bank have a similar relationship, but are obtained by halving the frequencies of the tones in the first bank. The tones in the two banks using such a relationship may be as follows:

| First Bank | | Second Bank | |
|---|---|---|---|
| # | Freq. | # | Freq. |
| 0 | 2400 | 0A | 1200 |
| 1 | 2253.43 | 1A | 1126.72 |
| 2 | 2115.82 | 2A | 1057.91 |
| 3 | 1986.61 | 3A | 993.3 |
| 4 | 1865.29 | 4A | 932.64 |
| 5 | 1751.38 | 5A | 875.69 |
| 6 | 1644.42 | 6A | 822.21 |
| 7 | 1544 | 7A | 772 |
| 8 | 1449.71 | 8A | 724.85 |
| 9 | 1361.18 | 9A | 680.59 |

With such tones, the third harmonic of any tones of one bank that happen to fall within the frequency spectrum of the second bank fall substantially midway between the channels.

The feature of operating the switch 52 to start the transmitter 20 and then releasing that switch to start the sequence of tones insures that the carrier wave will be produced before the tones commence, so that no part of the tone sequence is lost. Alternatively, there could be employed a delay after the encoder is operated to allow the carrier wave to be produced, after which delay a quick start oscillator produces the tones.

It is contemplated that the encoder 50 will be used to transmit to a base station having a display or other means of enabling the base station operator to evaluate the codes received. For example, a board may display a three-digit number in which the first two digits represent the identification of the encoder transmitting, and the last digit represents his status. If the number "123" appeared on the board, the base station operator would know that vehicle 12 is communicating with him and his status is 3 which may mean that that vehicle is ready for assignment. It is also contemplated that the decoder in such base station would have the frequency division structure described above. It becomes even more important in the decoder because the decoder in the base station would have to have capabilities to respond to a large number of different codes corresponding to the number of encoders in the field.

FIG. 3 depicts a receiver 250 in which RF signals are applied to an antenna 252, then amplified by an RF amplifier 254, which is heterodyned in a mixer 256, using a local oscillator 258. The resulting IF signal is amplified in an amplifier 260 and then further amplified to limiting by a limiter 262. A discriminator 264 detects the modulation components in the signal, which modulation components include a sequence of tones followed by electrical signals representative of intelligence. The demodulated signal is coupled by way of a transformer 266 to a speaker 268, wherein the signal is converted into sound waves. In order for such conversion to take place, the contacts 270, which are normally open, must be closed. These contacts are part of a relay having a winding 272. When the winding 272 is energized, in the manner to be described hereinafter, the contacts 270 close, and the speaker 268 can reproduce the electrical signals applied thereto.

Figure 4:
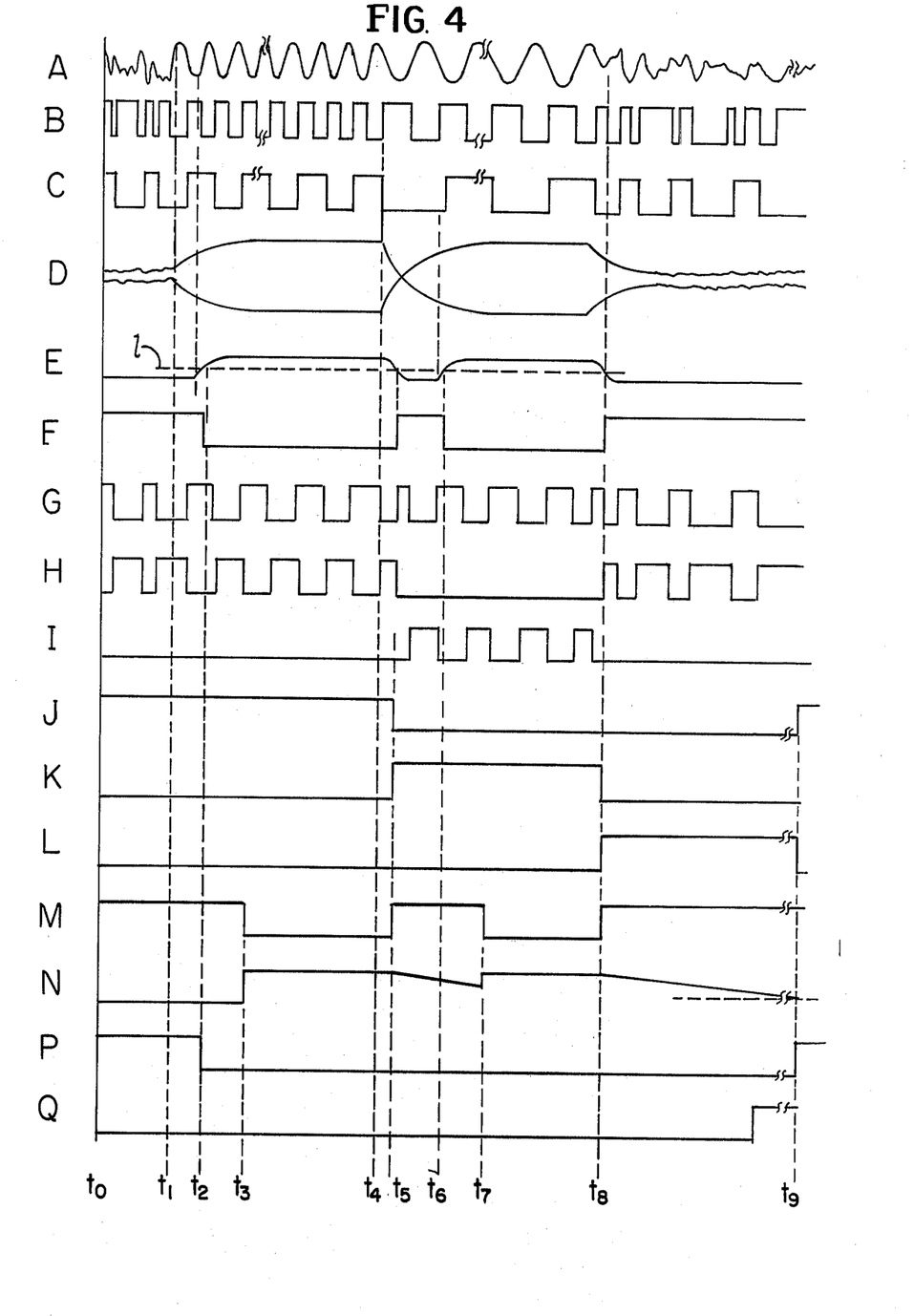
FIG. 4 is a timing diagram showing wave forms at various points in the diagram of FIG. 3.

The demodulated signals on the secondary of the transformer 266 are applied to a decoder 280 which includes a transformer 282. The demodulated signals on the secondary of the transformer 282 are depicted in FIG. 4A, and include noise and other extraneous components during the interval $t_o-t_1$, a first tone during the interval $t_1-t_5$, a second tone during the interval $t_5-t_8$, followed by a voice message during the interval $t_8-t_9$. The gaps in FIG. 4A indicate that many cycles of the signals may appear during each interval. For example, each of the two tones may have a duration of 100–150 ms. The demodulated signals are limited by the back-to-back diodes 284 and 286, and are impedance matched and filtered by the resistors 288–294 and the capacitor 296. The demodulated signals are amplified in an amplifier 298, to convert them into a square wave of the same frequencies, as shown in FIG. 4B. The square wave is applied to a Schmitt trigger circuit 300 which, in turn, supplies a square wave for the clock input C of a multiplier circuit 320. An example of such multiplier circuit is the flip-flop device illustrated in FIG. 1A, and used as the multiplier circuit 152. The R, S, and V inputs of the multiplier circuit 320 are grounded, while the D input and the Q output are connected together. The multiplier circuit 320 performs in the same manner as the multiplier circuit 152 of FIG. 1, that is, the signal produced at the Q output, as shown in FIG. 4C, has a frequency one half the frequency of the square wave shown in FIG. 4B.

The Q output of the multiplier circuit 320 provides one input of a NOR gate 322, the other input of which is derived from a counter 382 in a manner to be presently described, which input is shown in FIG. 4K. Such input to the NOR gate 322 is initially low and therefore its output, as shown in FIG. 4H, will be the inverse of the Q output of the multiplier circuit 320. At time $t_5$ when the input to the NOR gate 322 derived from the counter becomes high, as shown in FIG. 4K, the output from such NOR gate becomes low, as shown in FIG. 4H.

The wave form shown in FIG. 4K also constitutes an input to a NOR gate 324 which is connected as an inverter. The output of the NOR gate 324 is connected as one input to a NOR gate 326, the other input thereof being derived from the Schmitt trigger 300. Initially, when the signal shown in FIG. 4K is low, the corresponding input to the NOR gate 326 is high, whereby the output thereof, as shown in FIG. 4I, is low. On the other hand, when the signal shown in FIG. 4K becomes high at time $t_5$, the corresponding input to the NOR gate 326 becomes low, and the output thereof follows the output from the Schmitt trigger 300, but is inverted. The output from the NOR gate 326 is shown in FIG. 4I. The NOR gates 322 and 326 are coupled as inputs to a NOR gate 328 which responds to the signals shown in FIGS. 4I and 4H to furnish the signal shown in FIG. 4G. It will be noted that when the first tone is present during the interval $t_1-t_4$, the output of the NOR gate 328 is a square wave having half the frequency of the signal shown in FIG. 4A, wherein, during the interval $t_5-t_9$ the frequency of the square wave at the output of the NOR gate 328 is the same as the frequency of the second tone.

The signal at the output of the NOR gate 328 is applied to a reference circuit 330 which is a voltage doubler and acts to rectify the signal from the NOR gate 328 and provide a reference voltage on the conductor 332.

The signal from the NOR gate 328 is also applied to a filter 334 comprised of a pair of capacitors 336 and 338 and an inductor 340 having ten taps 340a to 340j. One end 340k of the inductor 340 is connected to the junction of the capacitors 336 and 338. A terminal block 342 has a plurality of electrical sockets 342a–342j respectively coupled to the taps 340a–340j. Also, the block has a set of sockets 344a–344d respectively coupled to the collectors of four PNP switching transistors 346a–346d, the emitter of each of which switching transistors is coupled to the supply voltage. Associated with the block 342 is a plug 348, having pins 348a–348j and 350a–350d. The plug 348 is adapted to be programmed to set the code to which the decoder 280 is to respond, by connecting jumper wires from selective ones of the pins 348a–348j to the pins 350a–350d. As an example, the pins 348i, 348g, 348e, and 348b are respectively connected by way of jumper wires 352 to the pins 350a–350d, so as internally to program the decoder to receive a sequence of four predetermined tones. However, as will be described, the decoder 280 has other elements so connected that it requires a sequence of only two tones to become actuated.

Initially, during the interval $t_o-t_5$ the transistor 346a is conducting, whereas the transistors 346b–346d are initially nonconducting, the reasons for which will be described in greater detail hereinafter. Then, the supply voltage on the emitter of the transistor 346a is coupled through its collector, through the socket 344a, the pin 350a, the corresponding jumper 352, the pin 348i, the socket 342i, whereby that portion of the inductor 340 between the tap 340i and the end 340k will be in the filter 334. The resonant frequency of the filter 334 will be determined by the value of such inductance and the value of the capacitors 336 and 338. When there is applied to the filter 334 a signal having such resonant frequency, a substantial output will be generated. In a manner to be described hereinafter, the resonant frequency of the filter 334 charges at time $t_5$ because a different amount of inductance has been switched into the circuit (the inductance between the tap 340g and the end 340k).

If the square wave output of the NOR gate 328 (FIG. 4G) during the interval $t_1-t_5$ has a frequency corresponding to the resonant frequency of the filter 334 prior to $t_5$, the output of such filter will have the substantial amplitude shown in FIG. 4D during the interval $t_1-t_5$. If the square wave output of the NOR gate 328 during the interval $t_5-t_8$ has a frequency corresponding to the resonant frequency of the filter 334 during that interval, then the amplitude of the output during that interval will also be substantial, as shown in FIG. 4D. FIG. 4D depicts the characteristic of the output of the NOR gate 328 that it takes some time to increase to full amplitude when the tone begins (on the order of 5–50 ms. for example) and some time to decrease to zero amplitude after the tone terminates (on the order of 20 ms. for example).

The output of the filter 334 is applied to a rectifier 362 which detects the envelope of the filter output (i.e., it rectifies such output), as long as the output exceeds the reference voltage on the conductor 332 produced by rectification of the entire demodulated signal. The rectified signal, as shown in FIG. 2E, is applied to a clipper 364. When the amplitude of the rectified signal increases to level "1" at a time $t_2$, shortly after the first tone has commenced, the clipper 364 will operate and its output becomes low, as shown in FIG. 4F. The switching level "1" of the clipper 364 is determined by the bias furnished by the resistors 363a and 363b applied to its other input. When the first tone terminates at $t_4$, the rectified signal begins to fall in amplitude in accordance with the decreasing amplitude of the envelope shown in FIG. 4D. When the rectified signal amplitude reaches the switching level at time $t_5$, the output of the clipper 364 becomes high again and stays high until $t_6$, at which time the rectified signal arising from the second tone has reached the switching level, thereby causing the clipper output to become low. Such output remains low until $t_8$. At $t_8$, shortly after the second tone terminates, the switching level of the clipper 364 is reached and the output of the clipper 364 becomes high, at which level it remains until an ensuing tone sequence.

Coupled to the output of the clipper 364 is a resistor 366 and a capacitor 368 in series to the supply voltage, the juncture of the two being coupled to a NAND gate connected as an inverter 370. A diode 369 is coupled in parallel with the resistor 366. Subsequent to the last tone sequence applied to the decoder 280, the capacitor 368 had been rapidly charged through the diode 369. When the output of the clipper 364 becomes low at $t_2$, the capacitor 368 discharges through the resistor 366 at a rate determined by the values of the resistor 366 and the capacitor 368. After the resultant delay, the voltage at the input to the inverter 370 reaches a value to cause same to switch, whereby its output becomes high.

The inverter 370 is coupled to a Schmitt trigger 384. Referring to FIG. 2M, the output of the Schmitt trigger 384 is normally low. At time $t_3$, after the above-mentioned predetermined delay has passed, the output of the inverter 370 becomes high, which causes the output of the Schmitt trigger 384 to become low. After the first tone terminates, at $t_5$, the capacitor 368 is rapidly charged through the diode 369, causing the output of the inverter 370 rapidly to become low, thereby causing the output of the Schmitt trigger 384 to become high at time $t_5$. After the predetermined delay has passed, following $t_6$, that is, at time $t_7$, the output of the Schmitt trigger 384 becomes low and remains low until $t_8$ which is shortly after termination of the second tone. The capacitor 368 is rapidly charged at $t_8$, causing the output of the Schmitt trigger 384 to become high and to remain high until the next tone sequence. The delay between time $t_2$, when the leading edge of the negative-going transition at the output of the clipper 364 becomes low, and time $t_3$, when the output of the Schmitt trigger 384 becomes low, is determined by the values of the resistor 366 and the capacitor 368, which predetermined delay may be on the order of 30 ms., for example. Such delay insures that noise or other short duration signals will not unintentionally trip the decoder 280.

The output of the inverter 370 is also coupled to a timing circuit 372, comprising a resistor 374, a diode 376 coupled in parallel therewith, and a capacitor 378 coupled to ground. The output of the timing circuit 372 is coupled to a NAND gate connected as an inverter 380, which in turn is coupled to the counter 382. When the output of the inverter 370 becomes high at $t_3$, the capacitor 378 is rapidly charged through the diode 376, causing the output of the inverter 380 to become low, as shown in FIG. 4P. At $t_5$, shortly after the first tone terminates, the output of the NAND gate 370 becomes low and the capacitor 378 begins to discharge through the resistor 374. If no second tone is received, then the capacitor 378 will discharge to the point where the output of the inverter 380 will become high. However, in the example of FIG. 4, a second tone of the proper frequency is received at $t_4$. At $t_7$, after the delay furnished by the capacitor 368 and the resistor 366, the output of the inverter 370 again becomes high rapidly charging the capacitor 378 back to its maximum value, as shown in FIG. 4N. When the second tone terminates, the capacitor 378 again discharges, but because no subsequent tone is received, it discharges to a level at $t_9$ when the output of the inverter 380 becomes high (FIG. 4P). Thus, the output of the inverter 380 is low from $t_3$ to $t_9$.

The transistors 346a to 346d are sequentially rendered conductive by, and certain of the inputs to the gates 322 and 324 are derived from, a counter 382. The counter 382 has substantially the same construction as the counter 176 used in the encoder of FIG. 1. In this form, the "0" to "3" outputs are used, so those are the only ones shown. The CE input is grounded, the R input is coupled to the inverter 380, and the C input is coupled to the Schmitt trigger 384. The "0" output is coupled as an input to an NPN transistor 386a, the collector of which transistor is coupled to the base of the transistor 346a. The transistors 386a and 346a define an electronic switch. The "1", "2" and "3" outputs are respectively coupled to NPN transistors 386b, 386c and 386d, the collectors of which transistors are respectively connected to the bases of the transistors 346b, 346c, and 346d. Associated pairs of the transistors (e.g., 386b and 346b) define electronic switches.

Initially, the "0" output of the counter 382 is high (FIG. 4J), thereby actuating the switch consisting of the transistors 386a and 346a, to cause the associated portion of the inductor 340 to be coupled in circuit in the filter 334, as previously described. At time $t_3$, the reset input (FIG. 4P) becomes low, whereupon the counter 382 is in condition to be stepped. As can be seen in FIG. 4M, the first positive transition of the C input to the counter 382 occurs at time $t_5$, on termination of the first tone, causing the counter 382 to step so that the "1" output becomes high (FIG. 4K). The transistors 386b and 346b conduct, thereby coupling in the filter circuit 334 another portion of the inductor 340, as previously described. Similarly, when the "2" output of the counter 382 becomes high (FIG. 4L), in response to a clock pulse at $t_8$, another portion of the inductor 340 is connected in circuit with the filter circuit 334 to change the resonant frequency thereof. Since the decoder 280 is arranged to respond to only two tones, there will be no further clock pulses to cause the counter 382 to step to cause the "3" output to become high. The connections are there, however, so that the decoder 280 can be modified to accept more than two tones. The jumper connected to terminals 350c and 350d would not ordinarily be used if the decoder responds only to two tones.

The "1" and "3" outputs of the counter 382 are coupled by way of diodes 388 and 390, across a resistor 392, to the gates 322 and 324 to provide the inputs thereto described previously. At time $t_8$, the R input to the counter 382 becomes high, whereupon the counter 382 is reset to cause the "0" output to become high and the rest of the outputs "1"-"3" to be low. Thus, the counter 382 is reset either when the two-tone sequence is completed or when a second tone is not received.

The "2" output of the counter 382 is coupled through a resistor 400 to the base of an emitter follower NPN transistor 402, the collector of which is coupled to the supply voltage and the emitter of which is coupled to a resistor 404 connected to ground. The emitter of the transistor 402 is coupled through filtering elements 406 to the control electrode of an SCR 408, the cathode of which is coupled to ground and the anode of which is coupled through a large resistor of for example, 100K to the supply voltage. The anode of the SCR 408 is also coupled to the supply voltage through a diode 412, the relay winding 272 and the normally closed contacts 56 of the switch 52. A bulb 414 and a diode 416 are coupled in series between the contacts 56 and the anode of the SCR 408. The anode of the SCR 408 is coupled through a resistor 418 and a diode 420 to a NAND gate connected as an inverter 422. A resistor 424 is connected across the resistor 418 and the diode 420. A capacitor 426 is connected from the input of the inverter 422 to the supply voltage. The output of the inverter 422 is coupled to the second input of the NOR gate 214 (FIG. 1).

The transistor 402 is rendered conductive by the "2" output of the counter 382 becoming high at time $t_8$, after termination of the second tone, thereby causing a positive input to be applied to the control electrode of the SCR 408, rendering it conductive to cause current flow from the supply voltage, through the normally closed contacts 56, the relay winding 272, the diode 412 and the SCR 408. The current flow through the winding 272 closes the contacts 270, thereby enabling the speaker 268 so that it can reproduce the voice message which follows the tones (see FIG. 4A). Also, current flows from the supply voltage through the contacts 56, the bulb 414, the diode 416 and the SCR 408, to illuminate the bulb 414 thereby apprising the possessor of the receiver 250 that he is being paged. The relay winding 272 and the bulb 414 will remain energized until the switch 52 is actuated to open the contacts 56. Such actuation disrupts current flow through the winding 272 to open the contacts 270 and also extinguishes the bulb 414.

It will be remembered that another set of contacts 54 of the same switch 52 is used to initiate transmission of a sequence of tones by the encoder. In order to so use a common switch, it is necessary to insure that actuation of the switch 52 to extinguish the bulb 414 and de-energize the relay winding 272 does not also send out a tone sequence. To that end, the circuitry 418-424 is provided. When the SCR 408 is rendered conductive at $t_8$, shortly after termination of the second tone, a path is provided for the capacitor 426 to charge rapidly through the diode 420 and the resistor 418, thereby causing the output of the gate 422 to become high, as shown in FIG. 4Q. Such high output furnishes a high input to the NOR gate 214 which disables the encoder 50. When the switch 52 is actuated to open the contacts 56, the capacitor 426 discharges slowly to maintain the high input to the NOR gate 214 high for, say, one second. Thus, if the switch 52 is only momentarily actuated, after the decoder 280 receives a coded signal, the encoder 50 will not produce a tone sequence. However, if the switch 52 is maintained actuated for more than one second, then the encoder will produce a sequence of tones.

The decoder 280 responds to a sequence of two tones, by virtue of the input to the transistor 402 being derived from the "2" output of the counter 382. By moving the connection to the "3" output, the decoder 280 would be responsive to a sequence of three tones.

What has been described, is a decoder in which the frequency of every other tone applied to the filter is multiplied by a predetermined multiplier, in this instance, that multiplier being one half, and the remaining tones are applied to the filter without any change in frequency. In this way, a single filter 334, having one tapped inductor, is able to respond to twenty tones. These principles can be used in a decoder to respond to any number of tones in sequence.

Also, because of the smaller size of the encoder 50 and the decoder 280, they can be readily placed in the same package.

It is believed that the invention, its mode of construction and assembly, and many of its advantages should be readily understood from the foregoing without further description, and it should also be manifest that, while preferred embodiments of the invention have been shown and described for illustrative purposes, the structural details are, nevertheless, capable of wide variation within the purview of the invention as defined by the appended claims.

What is claimed is:

1. An encoder for a selective call transmitter, comprising oscillator means for producing a sequence of first tones, multiplier means coupled to said oscillator means for multiplying the frequencies of said first tones by a predetermined multiplier to produce a sequence of second tones, an output circuit coupled to said oscillator means and to said multiplier means for receiving the sequences of the first tones and the second tones, and control means coupled to said output circuit for rendering said output circuit operative to alternate between supplying said first tones and said second tones.

2. The encoder of claim 1, wherein said predetermined multiplier is one half.

3. The encoder set forth in claim 2, and further comprising switchable impedance means associated with said oscillator means for controlling the frequency of the tone produced thereby, and counter means coupled to said switchable impedance means for sequentially changing the amount of impedance furnished thereby to cause said oscillator means to produce the sequence of first tones.

4. The encoder set forth in claim 1, wherein said control means includes a counter means.

5. An encoder for a selective call transmitter, comprising oscillator means for producing a tone of selected frequency, switchable impedance means associated with said oscillator means for controlling the frequency of the tone produced thereby, counter means coupled to said switchable impedance means for sequentially changing the amount of impedance furnished thereby to cause said oscillator means to produce a sequence of tones, clock means for producing clock pulses at a predetermined rate, and switching means having a pair of inputs respectively coupled to said oscillator means and to said clock means for producing a sequence of pulses at said predetermined rate each having a leading edge in time coincidence with an instant when the amplitude of the tone produced by said oscillator means is substantially zero, said counter means having a clock input coupled to said switching means and being responsive in each pulse in the sequence of pulses to change the impedance to its next value, whereby each tone in the sequence of tones has a duration substantially proportional to the predetermined rate and is substantially in phase with the preceding tone in the sequence of tones.

6. The encoder set forth in claim 5, and further comprising latching means having two inputs and being operative to supply a latching voltage when an energizing signal is applied to one input and an unlatching voltage when a de-energizing signal is applied to the other input, and manual switching means for supplying an energizing signal to said one input, said counter means having an output for supplying to said other input a de-energizing signal on completion of the sequence of tones, said clock means being coupled to the output of said latching means and being responsive to the latching voltage to commence producing the clock pulses and being responsive to the unlatching voltage to discontinue producing the clock pulses.

7. The encoder set forth in claim 6, and further comprising indicator means coupled to said latching means and being responsive to the latching voltage to provide an indicator signal, to enable an operator of said encoder to be apprised of the production of the sequence of tones.

8. An encoder for a selective call transmitter, comprising oscillator means for generating tones selected from a first group of tones in a first bank of frequencies and for generating tones selected from a second group of tones in a second bank of frequencies separate and distinct from said first bank of frequencies, the tones in said second bank respectively being harmonics of the tones in said first bank, and means for receiving the tones from said oscillator means and for producing a sequence of tones alternately from said first and second groups.

9. The encoder of claim 8, wherein the frequencies of the tones in said first bank are substantially double the corresponding frequencies of the tones in said second bank.

10. The encoder of claim 9, wherein the third harmonic of any tone in said second bank falling within the frequency spectrum of said first bank falls substantially midway between adjacent tones in said first bank.

11. The encoder of claim 9, wherein each tone in each of the banks is the 11th root of 2 times the frequency of the next lower tone in each bank.

12. An encoder for a selective call transmitter, comprising oscillator means for producing a sequence of tones including at least one identification tone representing the identification of the encoder and at least one information tone representing information relative to said encoder, program means for internally fixing the frequencies and the order of said identification tones, selector means for externally selecting the frequencies of the information tones, whereby energization of said encoder automatically produces identification tones corresponding to the program of said program means and information tones corresponding to the condition of said selector means.

13. The encoder of claim 12, wherein the information tones follow the identification tones.

14. The encoder of claim 12, wherein said program means includes a connector socket coupled to said oscillator means and a programmed plug removably located in said socket.

15. The encoder of claim 12, wherein the sequence of tones includes a sequence of identification tones representing the identification of the encoder.

16. A decoder for a selective call receiver, comprising input means for supplying a sequence of first tones, multiplier means coupled to said input means for multiplying the frequencies of said first tones by a predetermined multiplier to produce a sequence of second tones, an output circuit coupled to said input means and to said multiplier means for receiving the sequences of the first tones and the second tones, and control means coupled to said output circuit for rendering said output circuit operative to alternate between supplying said first tones and said second tones.

17. The decoder set forth in claim 16, wherein said predetermined multiplier is one half.

18. The decoder set forth in claim 16, and further comprising filter means coupled to said output circuit and being adapted to pass a tone having a frequency within a pass band center about the resonant frequency of the filter, switchable impedance means associated with said filter means for controlling the resonant frequency thereof, counter means coupled to said switchable impedance means for sequentially changing the amount of impedance furnished thereby to cause said filter means to pass a sequence of tones, said control means including said counter means.

19. In a selective call transmitter having audio amplifier circuitry for selectively amplifying intelligence applied thereto, an encoder comprising control means for providing a control voltage, oscillator means coupled to said control means for producing a sequence of tones in the presence of said control voltage, and disabling means coupled to said control means and being responsive to said control voltage to provide a disabling voltage, the audio amplifier circuitry being coupled to said disabling means and being responsive to said disabling voltage to prevent transmission of electrical signals representing the intelligence.

20. An encoder for a selective call transmitter, comprising oscillator means for producing a sequence of first tones, multiplier means coupled to said oscillator means for multiplying the frequencies of said first tones by a predetermined multiplier to produce second tones, and control means coupled to said multiplier means for rendering said multiplier means operative alternately to supply said first tones and said second tones.

21. The encoder of claim 20, wherein said multiplier means includes an output circuit, and said control means is coupled to said output circuit for operation thereof.

22. A decoder for a selective call receiver, comprising input means for supplying a sequence of first tones, multiplier means coupled to said input means for multiplying the frequencies of said first tones by a predetermined multiplier to produce a sequence of second tones, and control means coupled to said multiplier means circuit for rendering said multiplier means operative alternately to supply said first tones and said second tones.

23. The decoder set forth in claim 22, wherein said multiplier means includes an output circuit and said control means is coupled to said output circuit for operation thereof.

* * * * *